C. L. LONG AND C. SCHMAUS.
CUTTER HEAD FOR WOODWORKING MACHINES.
APPLICATION FILED OCT. 15, 1917.
1,387,278.
Patented Aug. 9, 1921.
3 SHEETS—SHEET 2.
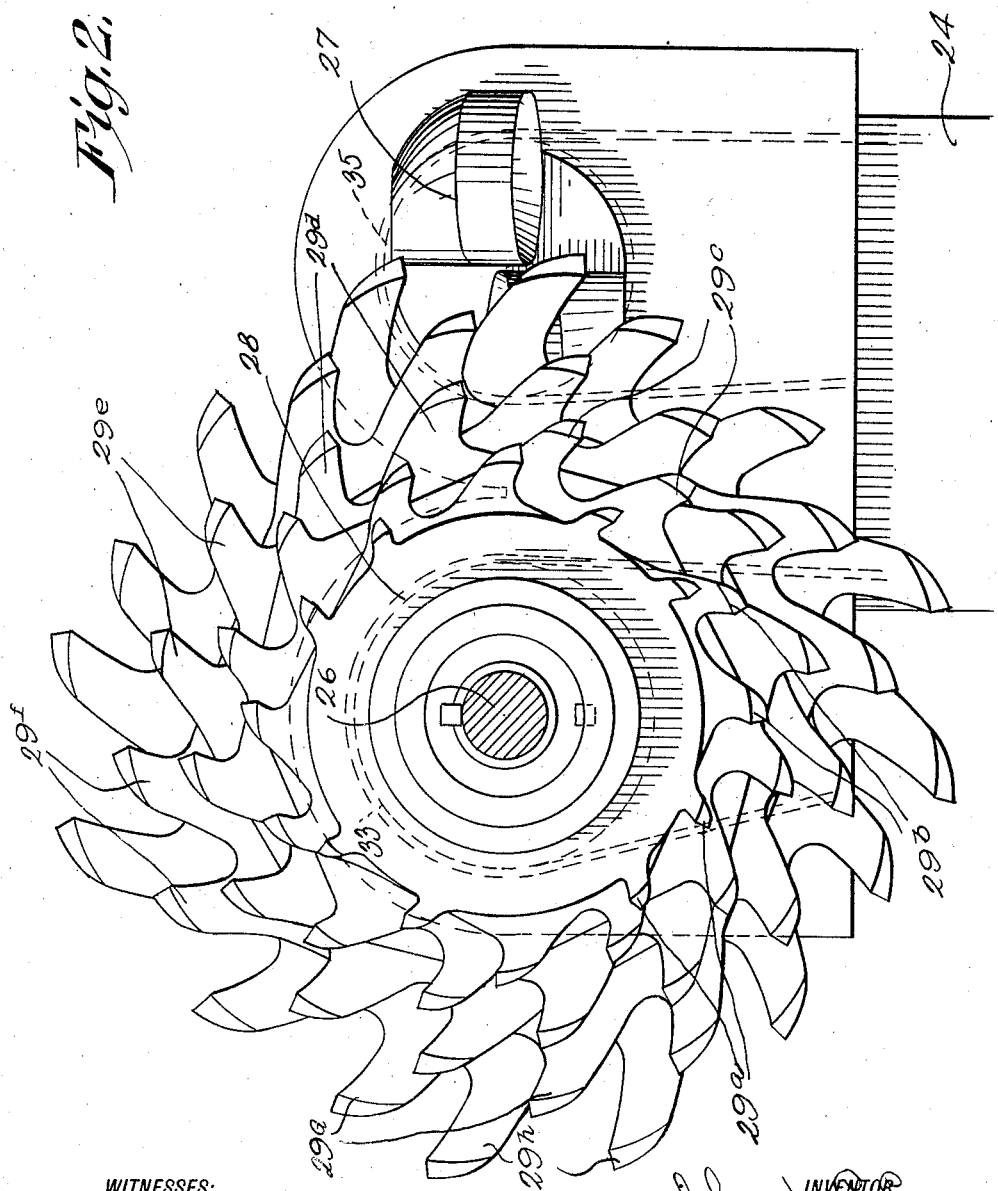

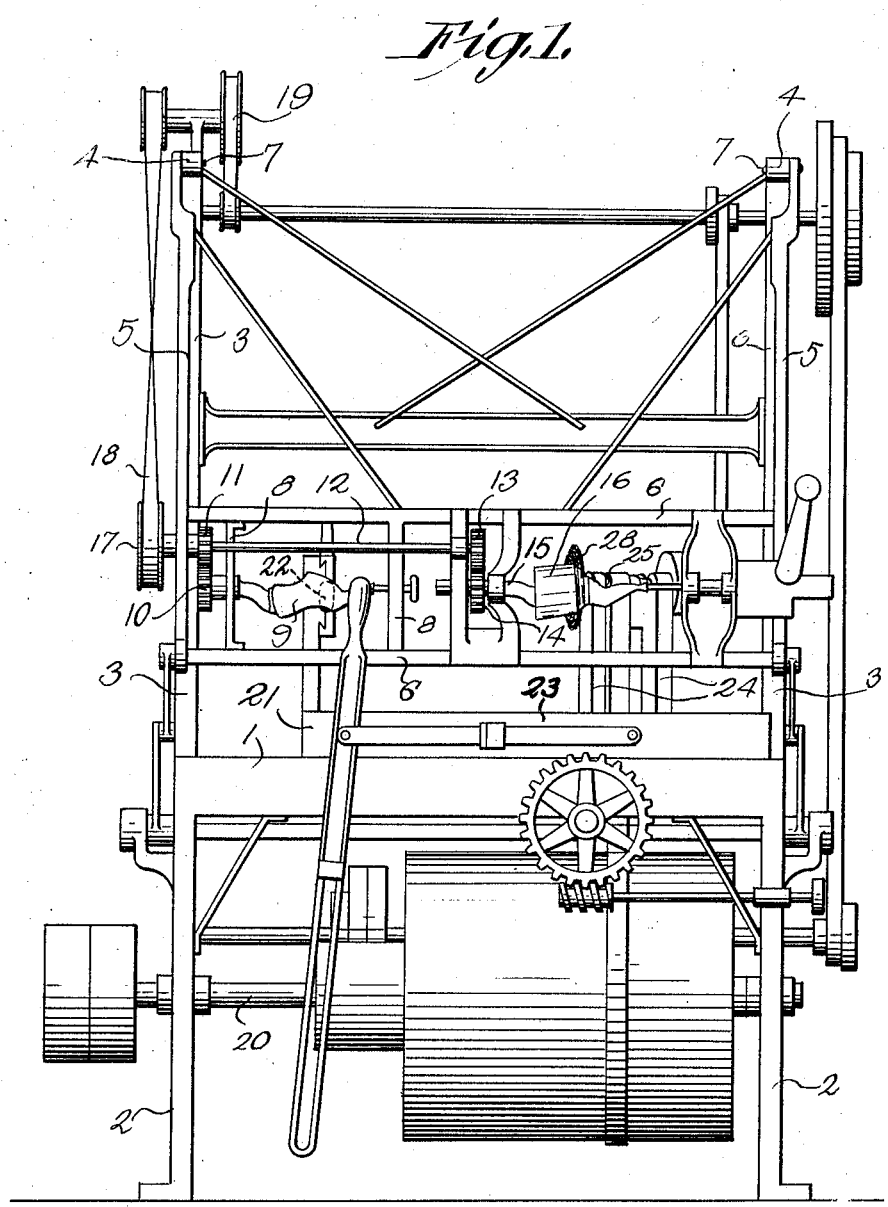

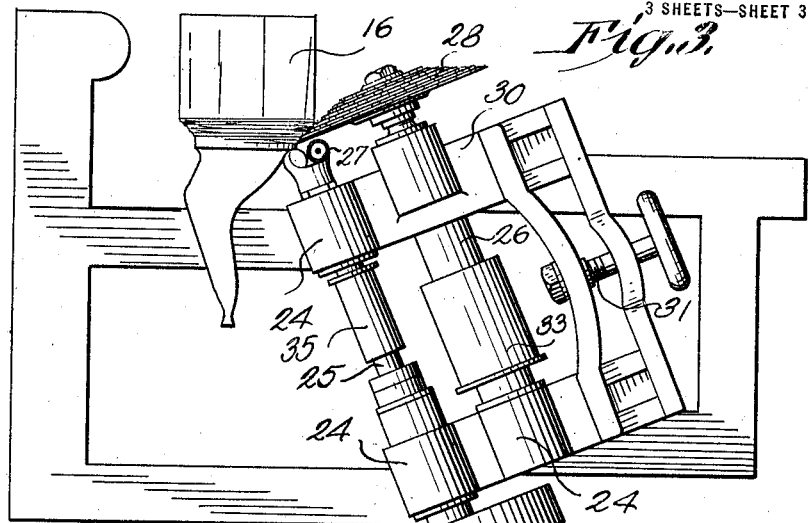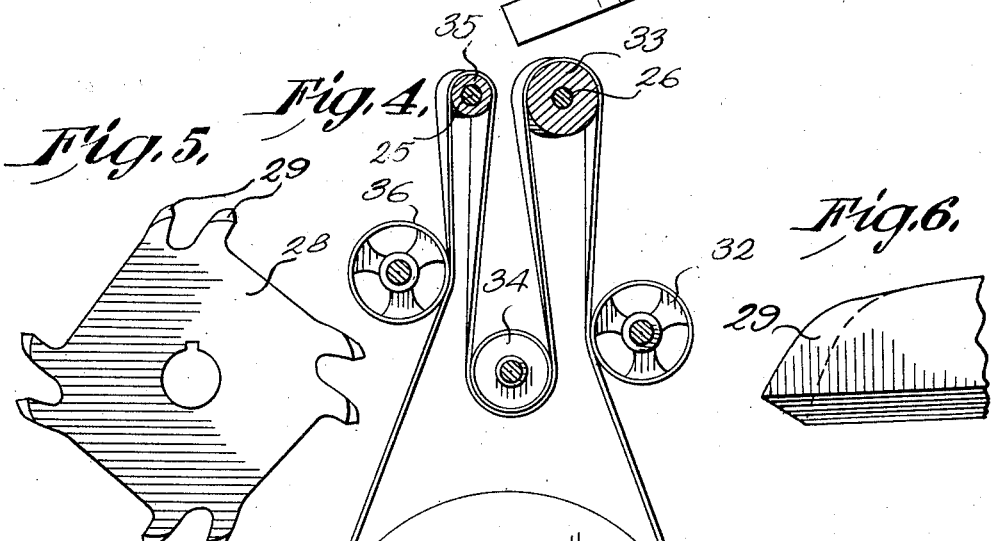

UNITED STATES PATENT OFFICE.

CLAUDE L. LONG AND CONRAD SCHMAUS, OF DAYTON, OHIO, ASSIGNORS TO THE CRAWFORD, McGREGOR AND CANBY CO., OF DAYTON, OHIO, A CORPORATION OF OHIO.

CUTTER-HEAD FOR WOODWORKING-MACHINES.

1,387,278.     Specification of Letters Patent.     Patented Aug. 9, 1921.

Application filed October 15, 1917. Serial No. 196,617.

*To all whom it may concern:*

Be it known that we, CLAUDE L. LONG and CONRAD SCHMAUS, citizens of the United States, residing at Dayton, in the county of Montgomery and State of Ohio, have invented certain new and useful Improvements in Cutter-Heads for Woodworking-Machines, of which the following is a specification.

Our invention relates to wood working machinery and more particularly to a rotary cutter head therefor. While the invention has been herein shown and described as applied to a pattern or irregular shape turning machine to which it is particularly adapted, it is to be understood that the invention is not limited to turning lathes of this type, but may be applied to other wood working apparatus.

The object of the invention is to improve the construction, as well as the means and mode of operation of such devices, whereby they will not only be cheapened in construction, but will be more efficient in use, uniform in operation, of large capacity, and unlikely to get out of repair.

In the turning of irregular shapes, such as shoe lasts, gun stocks, heads for golf sticks, smoking pipes, and other articles of like irregular formation it has heretofore been the custom and practice to score or preturn the block of material from which the article is to be produced, whereby the block is given an initial general contour somewhat approximating the shape of the finished product. The particular form of cutter head hereafter described affords such working capacity that it has been found in practice unnecessary to preturn or score the material. To provide a suitable cutter head having capacity for an extremely deep, as well as shallow cuts is one of the primary objects of the present invention. Furthermore, the shape and construction of the head is such, that while the head possesses an effective depth of operation of considerable extent, the material is removed gradually and uniformly in small pieces or chips, thereby avoiding unnecessary chipping or checking of the material.

While the cutter head, forming the subject matter hereof, is preferably employed in conjunction with a finishing cutter, which follows in operation the main or roughing cutter, it will be understood that for some classes of work, the finishing cutter herein shown and described may be omitted and the roughing or advance cutter alone employed.

With the above primary and other incidental objects in view, as will more fully appear in the specification, the invention consists of the features of construction, the parts and combinations thereof, and the mode of operation or their equivalents, as hereinafter described and set forth in the claims.

In the drawings Figure 1 is a front elevation of an irregular shape or pattern lathe to which the present invention has been applied. Fig. 2 is an end elevation of the cutter heads, illustrating the relation of the roughing or advance cutter and the finishing cutter. Fig. 3 is a top plan view of the cutter head carriage. Fig. 4 is a detail view illustrating the belt drive for the cutter heads. Fig. 5 is a detail view of one of the cutter head blades or disks. Fig. 6 is a detail view of one of the cutting teeth illustrating the shape and mode of grinding same.

Like parts are indicated by similar characters of reference throughout the several views.

While the present invention relates primarily to the construction, arrangement and mode of operation of the primary or roughing cutter head and its relation with the finishing cutter, together with their driving connection, in order to illustrate the application of the invention and its relation to other portions of the apparatus and the mode of operation, there has been shown in the drawings, a last turning machine of a type commonly employed, to which the invention has been applied. This pattern lathe or last turning machine comprises a bed portion 1 supported on legs 2. From the bed 1 extend upright standards 3 connected with the other and suitably braced to form a rigid main frame.

Pivotally mounted upon forward extending arms 4, carried by the upright standards 3, is a swinging frame comprising pendant arms 5 connected by transverse bars 6 and suitably braced into a rigid structure, which is free to oscillate forward and rearward about its pivotal connections 7. Carried upon suitable trunnions, journaled in bearing bars 8, is the revoluble master form 9. The driving trunnion of the master form carries a gear pinion 10, meshing with a corresponding pinion 11, upon a counter shaft 12. The counter shaft carries a second pinion 13 meshing with a corresponding pinion 14, upon the drive spindle or trunnion 15, with which the block or work to be operated upon is engaged. The counter shaft 12 carries at its extremity a pulley 17, connected by a belt 18 with a shaft 19, operatively connected through sundry belts and counter shafts with the main drive shaft 20 journaled in the lower part of the main frame. The rotation of the main shaft 20 drives the master form 9 and the work or block 16, to be turned, at a uniform rate of speed regardless of the oscillatory movement of the swinging frame.

Slidingly mounted upon the bed 1 is a carriage 21, carrying a master or guide wheel 22 and a second carriage 23, which supports a rotary cutter head. These sliding carriages 21 and 24 move in unison under the influence of suitable feed mechanism. The oscillatory movement of the swinging frame is controlled by the engagement of the master or guide wheel 22 with the master form 9. The sliding movement of the carriages causes the master wheel and the cutter head to successively engage every portion of the master form 9 and the work or block operated upon.

As thus far described, the construction and operation is that of the usual last turning machine or pattern lathe and forms no part of the invention *per se*.

Journaled in uprights or standards 24 supported upon the carriage 23 and arranged at an inclination to the axis of rotation of the work and the path of travel of the carriage are two parallel shafts 25 and 26. Upon the shaft 25 is carried the finishing cutter which in the drawing has been shown as comprising a plurality of cup shaped cutters arranged upon a suitable head or carrier. The operative diameter of the finishing cutter corresponds with that of the guide or master wheel 22.

Mounted upon the extremity of the second inclined shaft 26 and overhanging the finishing cutter 27 is the primary or roughing cutter, which is of a flattened or truncated conical form and as shown in the drawings, comprises a plurality of circular saws of different diameter arranged side by side upon the shaft 26, and rotating in unison. The circular disks or saw blades 28, may if desired, have uniformly spaced teeth 29, about their entire periphery. However, as shown in the drawings, particularly in detail view Fig. 6, the teeth of the several disks or blades are arranged in pairs, such pairs of teeth being positioned in spaced relation. As shown, there are four pairs of teeth upon each disk or saw arranged in equally spaced relation or substantially 90 degrees apart. It will be understood however, that a greater or less number of teeth may be employed, and that the teeth may be differently spaced in relation, each with the other. As shown in Fig. 2, the teeth of the respective disks or blades are offset or staggered peripherally in relation with those of adjacent disks or blades.

In order that the teeth of the several disks or blades may be readily distinguished, they have been designated in Fig. 2 as $29^a$, $29^b$, $29^c$, $29^d$ and $29^e$. These teeth are peculiarly ground or sharpened as shown in the perspective detail, Fig. 6 whereby they afford, not only the saw-like peripheral engagement, but also shearing action upon the face or breast of the work, or that portion of the material being cut away. The carriage is advanced through a path parallel with the work, with the cutter head foremost. By this arrangement, the primary or roughing cutter comprising the series of graduated disks or saws assembled into a conical cutter head is advanced apex foremost against the breast or lateral face of the material to be removed. Thus the work is first engaged by the smallest or terminal disk or saw of the series, then in regular sequence by each succeeding enlarged saw or disk. This produces a uniform operation, each succeeding cutting disk or blade taking up its operation where the preceding cutting blade left off. That is to say, the scarf produced by the initial or smallest disk of the series is deepened a definite extent by the next disk of the series and this scarf or cut is again deepened by the next disk and so on throughout the series.

The several disks, each operating one after the other in parallel and advanced from one plane of operation to another by the movement of the carriage, the material is removed uniformly by the several disks of the series in a rapid and efficient manner.

As is to be noted in Figs. 2 and 3, the primary or roughing cutter head comprising the series of disks before mentioned, overhangs or extends somewhat beyond the circle of operation of the finishing cutter head 27. In Fig. 2 the outermost teeth of the roughing cutter head are shown as extending slightly beyond the center of rotation of the finishing head. This overlap or relation of the cutter head may be varied by the lateral adjustment of an auxiliary head 30 in which the shaft 26 is mounted. As shown in Fig. 3, this auxiliary head may be adjusted to and fro to vary the overlapping relation of the cutter head by the adjustment of a screw 31. It is to be noted that the offset or spiral relation of the teeth of the several disks form a continuous spiral succession, whereby the work is engaged by the teeth of each disk in regular order. This will be clearly indicated by the application of the reference characters to the teeth in Fig. 2 in which a single series of teeth are so marked.

The cutter heads are driven in unison by a single belt arranged as shown in Fig. 4. This belt passes around a driving drum 31, mounted upon the main shaft 20 in the lower portion of the main frame, and thence in contact with an idler pulley 32 and over the driven pulley 33 upon the shaft 26, thence around an idler pulley 34 and over the driven pulley 35 upon the shaft 25 by which the finishing cutter is operated, and thence past the idler pulley 36 to the driving drum 31. By this arrangement a single belt is utilized for driving both the cutter heads, thereby insuring the operation of the cutter heads at the same relative speed. However, the difference in diameter of the driven pulleys 33 and 35 upon the shafts 26 and 25 respectively, serves to rotate the finishing cutter at a higher rate of rotation than that of the primary or roughing cutter.

As shown in Fig. 3 the roughing cutter head and the finishing cutter head are set as closely together as is practical. The result is that the scarf or cut made by the terminal or final cutting disk of the primary head merges into the scarf or cut of the finishing cutter head.

By the construction herein described the roughing cutter head removes the surplus stock to an approximate form slightly in advance of the finishing cutter head which reduces the approximate form to a shape corresponding exactly with the master form. The cutter heads operating in planes so closely adjacent one with the other, are capable of being controlled by the single master or guide wheel, common to both cutter heads, which is not permissible when the cutter heads operate in more widely separated planes. Moreover, inasmuch as each of the cutting disks of the primary or roughing cutter head performs only a limited amount of work, each serving to deepen to a limited degree the cut or scarf of the preceding disk, the result will be more even, uniform production without the tendency to break or check the material. The degree of overlap of the roughing and finishing cutter is somewhat dependent upon the abruptness of the variation of contour of the finishing product. The greater the extent of the overlap, of course, the less will be the work left to be performed by the finishing cutter.

It is to be noted that the primary or roughing cutter instead of operating in the plane of its rotation, operates laterally or across the plane of rotation, thus performing the operation of an end miller, rather than that of a saw.

From the above description it will be apparent that there is thus provided a device of the character described, possessing the particular features of advantage before enumerated as desirable but which obviously is susceptible of modification in its form, proportion, detail construction or arrangement of parts, without departing from the principle involved or sacrificing any of its advantages.

While in order to comply with the statutes, the invention has been described in language more or less specific as to certain structural features, it is to be understood that the invention is not limited to any specific details, but that the means and construction herein described comprise but one mode of putting the invention into effect, and the invention is therefore claimed broadly in any of its possible forms or modifications within the scope of the appended claims.

Having thus described our invention, we claim:—

1. A wood working machine of the type embodying a work support in which the work is revolubly mounted, a cutter head support, and means for relatively moving the work support and cutter head support in a direction substantially parallel with the axis of rotation of the work and a cutter head, characterized by a plurality of peripherally serrated plates of different diameters concentrically arranged in progressive series to form a cone of low pitch, the face of which forms an abrupt angle with the axis of rotation of the work, said head engaging the work laterally, and a second rotary cutter of less diameter rotating in a parallel plane closely adjacent to the base of said conical head and projecting therebeyond.

2. In a pattern lathe for turning irregular shapes, means for rotating the work, a roughing cutter comprising a series of peripherally serrated plates of different diameter concentrically assembled in progressive series to form a conical cutter head of low pitch advancing laterally to the work, and a finishing cutter of less diameter eccentrically mounted in relation with the conical cutter head to rotate in a parallel plane closely adjacent thereto, and means for simultaneously rotating said heads.

3. In a lathe for turning irregular shapes, a work support in which the work is revolubly mounted, a cutter head support, means for relatively moving the work support and cutter head support in a direction substantially parallel with the axis of rotation of the work, a roughing cutter comprising a conical cutter head of low pitch mounted upon said support having a plurality of laterally exposed shear fingers of different radial extent in different parallel planes, and a finishing cutter of less diameter coacting with said head.

4. In a lathe for turning irregular shapes, a work support in which the work is revolubly mounted, a cutter head support, means for relatively moving the work support and cutter head support in a direction substantially parallel with the axis of rotation of the work, a roughing cutter comprising a plurality of peripherally serrated plates of different diameters arranged in a concentric progressive series to afford a conical cutter head of low pitch, and a finishing cutter of less diameter simultaneously engaging the work in a plane adjacent to but following the conical cutter head.

5. A machine for turning irregular shapes having a revoluble work support and a cutter support, said supports being relatively movable in a direction substantially parallel with the axis of rotation of the work, and a cutter head characterized by a conical series of revoluble plates engaging the work in the direction of its apex, and peripheral knife like projections, the radial edges of which are beveled toward one side of the plate and the peripheral edges of which are beveled toward the other side of the plate.

6. In a wood working machine, a revoluble cutter plate having radially disposed knife like projections, the advance radial edges of which are beveled toward one side of the plate, the ends of which are beveled toward the other side of the plate, said plate being laterally inclined in relation with the direction of relative movement of the cutter plate, and the work engaged thereby.

7. In a wood working machine, a revoluble cutter plate adapted to engage its work laterally in a direction inclined to its plane of rotation, peripheral teeth upon said plate, the radial edges of which are beveled upon the rear side of the plate, the ends of said teeth being beveled upon the advance side of said plate and means to relatively adjust said cutter plate and the work, laterally in relation with the plate.

8. A machine for turning irregular shapes having means for revolubly supporting the work and a cutter support, said supporting members being relatively movable in a direction substantially parallel with the axis of rotation of the work, characterized by a series of cutter plates of different diameters arranged in overlapping concentric relation to form a conical cutter head, the relative advance of the cutter head and the work being in a direction angular to the plane of rotation of the plates.

9. A machine for turning irregular shapes having means for revolubly supporting the work and a cutter support, said supporting members being relatively movable in a direction substantially parallel with the axis of rotation of the work, characterized by a series of cutter plates each having a plurality of substantially radially disposed shear fingers, the shear fingers of each plate extending radially beyond those of the preceding plate.

10. A pattern lathe for turning irregular shapes embodying a work support in which the work is revolubly mounted, a cutter head support, and means for relatively moving the work support and cutter head support in a direction substantially parallel with the axis of rotation of the work, characterized by a convex disk like revoluble cutter head having work engaging teeth distributed over its convex surface.

11. A pattern lathe for turning irregular shapes embodying a work support in which the work is revolubly mounted, a cutter head support, and means for relatively moving the work support and cutter head support in a direction substantially parallel with the axis of rotation of the work, characterized by a revoluble disk like cutter head having work engaging teeth distributed over its lateral face at different points intermediate the center and periphery thereof.

12. A pattern lathe for turning irregular shapes, embodying a work support in which the work is revolubly mounted, a cutter head support, and means for relatively moving the work support and cutter head support in a direction substantially parallel with the axis of rotation of the work, characterized by a convex disk like head having thereon a plurality of work engaging teeth arranged in successive series, the teeth of each series overlapping those of the succeeding series.

13. A pattern lathe for turning irregular shapes embodying a work support in which the work is revolubly mounted, a cutter head support, and means for relatively moving the work support and cutter head support in a direction substantially parallel with the axis of rotation of the work, characterized by a revoluble cutter disk having a plurality of work engaging serrations upon its lateral face.

14. A lathe for turning irregular shapes having relatively movable work and cutter supporting means, and a cutter spindle set obliquely to the direction of relative movement of the work and cutter support, characterized by a cutter disk on the portion of the spindle adjacent the work, work engaging teeth distributed substantially from the center to the periphery of said disk, and means to rotate the work and disk.

15. A lathe for turning irregular shapes having relatively movable work and cutter supporting means, and a cutter spindle set obliquely to the direction of relative movement of the work and cutter support, characterized by a rotary serrated disk carried on that portion of the spindle approaching the work, and means to rotate the disk and work in unison with their relative movement.

16. A lathe for turning irregular shapes, having relatively movable work and cutter supporting means, and a cutter spindle set obliquely to the direction of relative movement of the work and cutter support, characterized by a plurality of serrated disks concentrically arranged to form a conical cutter head carried on that portion of the spindle approaching the work, and means to rotate the work and cutter head.

17. A lathe for turning irregular shapes having means for revolubly supporting the work, and a cutter support, said supports being relatively movable in a direction substantially parallel with the axis of rotation of the work, characterized by a cutter spindle set obliquely to the direction of movement of said supports, a rotary cutter having a receding stepped cutting face, carried on the portion of the spindle adjacent the work and means to rotate the work and cutter.

18. A wood working machine having a support for the work, and a cutter shaft arranged obliquely to the lineal extent of the work, characterized by a series of serrated cutter disks of different diameters concentrically mounted on said shaft, said cutter disks being operatively movable in a path of travel substantially parallel with the lineal extent of the work in the direction of the convergence of the shaft and work, and means to rotate the disks.

19. A wood working machine having revoluble work and cutter supporting means relatively movable in a path of travel substantially parallel with the axis of rotation of the work, characterized by a series of concentrically arranged serrated disks carried by the cutter support rotating in planes inclined to the direction of relative movement of the work and cutter, and means to rotate the work and disks.

20. A wood working machine having revoluble work and cutter supporting means relatively movable in a path of travel substantially parallel with the axis of rotation of the work, characterized by a rotary cutter having a stepped cutting face inclined to its axis of rotation, carried by the cutter support and rotating in a plane inclined to the direction of relative movement of the work and cutter, and means to rotate the work and cutter.

21. A machine for turning irregular shapes having relatively movable work and cutter supports, characterized by a cutter head for negotiating abrupt and deep variations of contour in the work comprising a series of concentrically arranged serrated disks of different diameters inclined to the direction of relative movement of the work and cutter supports, and means to rotate the disks.

22. A machine for turning irregular shapes having relatively movable work and cutter supports characterized by a cutter head capable of cutting in accordance with abrupt curves and reëntrant angles of a last model, comprising a conical cutter head of low pitch and deep cutting range rotating in a plane inclined to the direction of relative movement of the work and cutter supports, and means to rotate the work and cutter head.

23. A machine for turning irregular shapes having relatively movable work and cutter supports characterized by a series of revoluble concentrically arranged serrated cutter disks inclined to the direction of relative movement of the work and cutter supports, means for operatively moving the work and cutter supports in the direction of convergence of the axis of the work and disks, and means for rotating the disks and work In testimony whereof, we have hereunto set our hands this 13th day of October, A. D. 1917.

CLAUDE L. LONG.
CONRAD SCHMAUS.

Witnesses:
 JOHN DINEEN,
 F. L. WALKER.